A. S. CUBITT.
CONTROL OF ELECTRICALLY OPERATED SWITCHES.
APPLICATION FILED MAY 7, 1908.
941,408.
Patented Nov. 30, 1909.
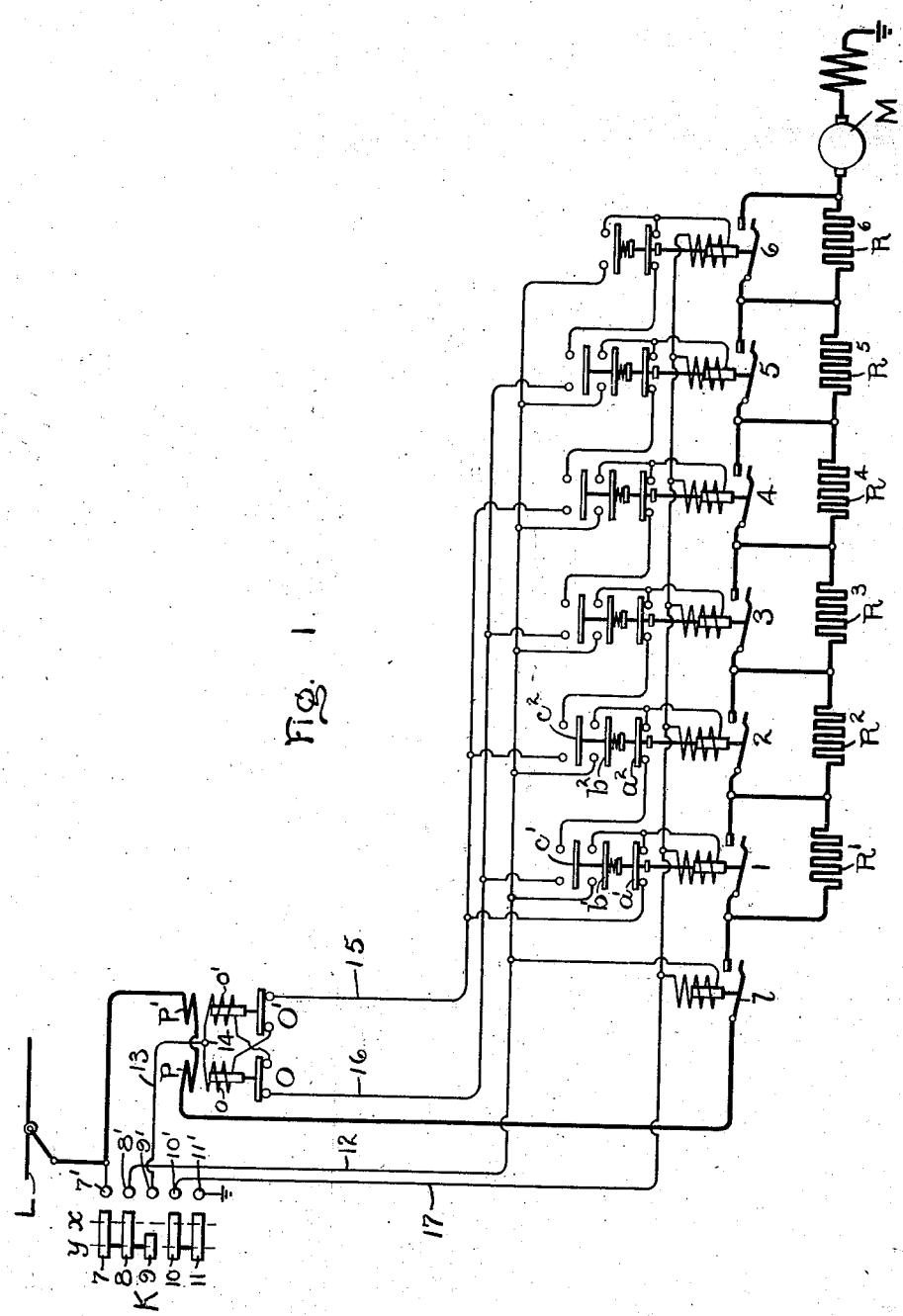
Witnesses
Lester H. Fulmer.
J. Ellis Glen
Inventor.
Archibald S. Cubitt.
by
Atty.

A. S. CUBITT.
CONTROL OF ELECTRICALLY OPERATED SWITCHES.
APPLICATION FILED MAY 7, 1908.
941,408.
Patented Nov. 30, 1909.
2 SHEETS—SHEET 2.
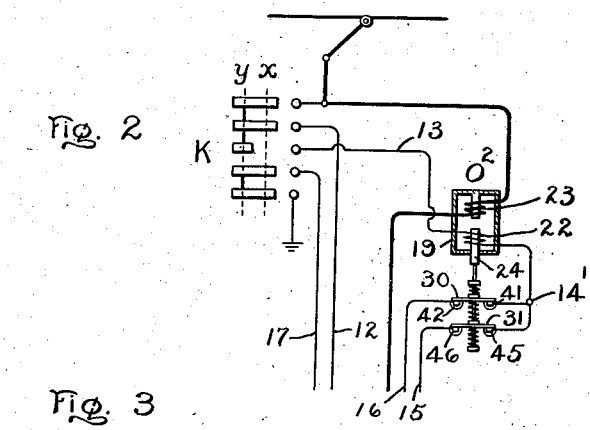
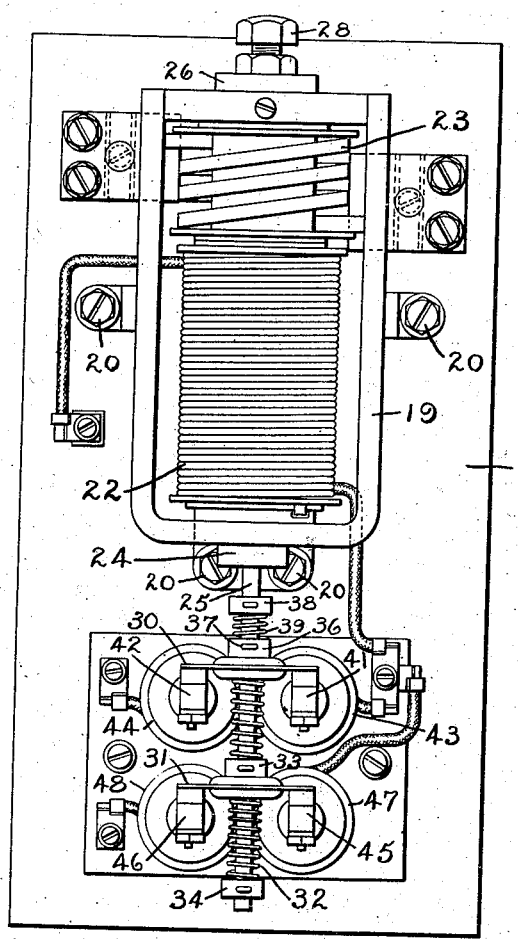
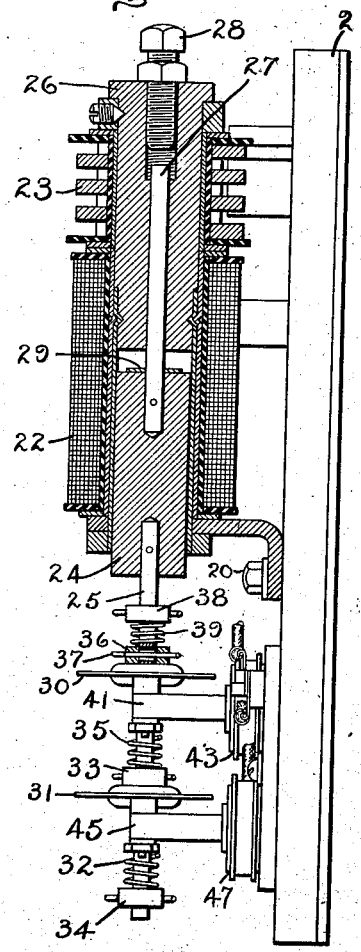
Witnesses
Lester H. Fulmer
J. Ellis Glen
Inventor
Archibald S. Cubitt.
by Albert G. Davis
Atty.

UNITED STATES PATENT OFFICE.

ARCHIBALD S. CUBITT, OF SCHENECTADY, NEW YORK, ASSIGNOR TO GENERAL ELECTRIC COMPANY, A CORPORATION OF NEW YORK.

CONTROL OF ELECTRICALLY-OPERATED SWITCHES.

941,408.  Specification of Letters Patent.  Patented Nov. 30, 1909.

Application filed May 7, 1908. Serial No. 431,442.

*To all whom it may concern:*

Be it known that I, ARCHIBALD S. CUBITT, a subject of the King of Great Britain, residing at Schenectady, in the county of Schenectady, State of New York, have invented certain new and useful Improvements in the Control of Electrically-Operated Switches, of which the following is a specification.

My invention relates to the operation of electrically controlled switches and particularly to the operation successively in a certain order of a plurality of such switches. It is especially useful in connection with systems of motor control in which a plurality of electrically controlled switches are arranged to operate in succession to increase step-by-step the voltage or current applied to the motor. Arrangements of this kind are employed in the starting of electric motors and have been so arranged that by closing a single switch the electrically controlled switches are caused to operate automatically in succession to cut out section-by-section resistance interposed in the motor circuit on starting, or in some other way to increase step-by-step the voltage or current applied to the motor. Such arrangements have also been used in systems of motor control in which a master switch serves to regulate the operation of the series of electrically controlled switches, the arrangement being such that the master switch may either directly control the operation of the switches one at a time or may cause any number or all of them to operate automatically in succession. In such systems of motor control it is desirable that a certain time interval, the length of which depends upon the conditions of service, should elapse between the operation of successive switches. To this end different arrangements have been employed. It is also often desirable that the successive operation of the switches be retarded if at any time the current in the motor circuit exceeds a certain value, due to closing of the switches too rapidly. Various systems have been used for giving this so-called "time and current limit" to the action of a series of switches used for the above described purposes, one of the best known arrangements being the use of a "notching relay" which serves to interrupt the actuating circuit for the series of switches after each switch has operated and to maintain said circuit interrupted as long as the motor current exceeds a certain value.

It is an object of my invention to provide an improved system of control for a plurality of electrically controlled switches such that the successive operation of said switches will take place with a definite interval of time insured between their successive operation, this interval, if desired, being controlled by the current in the motor circuit. To this end I use, in connection with a series of electrically controlled switches, a plurality of actuating circuits connected successively to successive switches and provide means controlled by current through said actuating circuits coöperating with means controlled by the switches themselves for causing energization of said actuating circuits successively.

I have shown my invention as applied to a simple system of control for a direct current motor, but this is merely illustrative and, as will be obvious to those skilled in this art, it may equally well be applied to the control of other forms of dynamo-electric machinery and to other types of control such, for example, as the well-known series-parallel method used extensively in the control of electrically driven cars.

Referring to the drawings, Figure 1 illustrates diagrammatically a system of motor control having my invention embodied therein; Fig. 2 is a view of a portion of a system similar to that shown in Fig. 1 but with a different form of relay mechanism applied thereto; Fig. 3 is a front elevation of a relay of the form shown diagrammatically in Fig. 2; and Fig. 4 is a side elevation, partly in section, of the relay shown in Fig. 3.

Referring to Fig. 1, at M is indicated the motor to be controlled. $R^1$ to $R^6$ are a plurality of resistances arranged to be interposed in the motor circuit in starting and to be short-circuited, respectively, by the electrically controlled switches of contactors 1 to 6 which may be of any well-known and suitable form. A source of current supply is indicated at L, the other side of the source being ground. A line switch $l$ when closed serves to connect the motor to the source through the resistances $R^1$ to $R^6$. A master switch K, shown diagrammatically in a usual manner, may be of any well-known form, such as a drum controller having segments 7, 8, 9, 10 and 11 which engage respectively with fingers 7', 8', 9', 10' and 11'. The finger 7' is connected to the source. The finger 8' is connected to a wire 12 which serves as an actuating circuit for the line switch $l$ and as a maintaining circuit for the switches 1 to 6, as will be hereinafter explained. Finger 9' is connected to a wire 13 which branches at 14 into two wires 15 and 16 which serve respectively as actuating circuits for switches 1, 3 and 5 and switches 2, 4 and 6. The wire 15 is connected in series with the actuating coil $o$ of a relay O and has interposed therein contacts closed by the relay O' when the same is deënergized. Similarly, the wire 16 is connected in series with the actuating coil $o'$ of the relay O' and in series with the contacts of the relay O. These relays O and O' may be of any well-known and simple form and may be provided respectively with heavy coils P and P' of few turns arranged in series with the motor circuit as shown. These relays are arranged to pull up on energization of the coils $o$ and $o'$, and to be held up by the magnetizing effect of the coils P and P' if the current through these coils exceeds a certain value. Relays for operation in this way are well-known and need not be described in detail. Finger 10' is connected to a wire 17 which serves as a return for the actuating coils of the line switch $l$ and the resistance controlling switches 1 to 6 inclusive. Finger 11' is connected to ground. Segments 7, 8 and 9 are electrically connected as are also segments 10 and 11. The switches 1 to 6 inclusive operate auxiliary switches of any well-known form, those illustrated being of the type in which contact disks, carried by a rod moved by the switch, are brought into engagement with fixed contacts, these disks being connected to the rod by means of springs and collars in a well-known manner. This form of auxiliary switches has been illustrated merely because it lends itself particularly well to diagrammatic illustration. The order in which the auxiliary switches of the electrically controlled switches 1 to 6 inclusive close will be apparent from the drawing and from the following description of the operation of the system.

The operation of the system of control illustrated is as follows: The master switch K being turned to its first position $x$ current passes from the source L to the finger 7', and through segments 7 and 8 to finger 8', through the wire 12 to and through the actuating coil of the line switch $l$, through wire 17 to the finger 10', and through segments 10 and 11 and finger 11' to ground which, as stated above, is the other side of the source. The line switch $l$ will close, therefore, and the motor circuit will be completed from the source L, through the resistances $R^1$ to $R^6$ and the motor M to ground. As long as the master switch remains in this position no further change in the circuits will take place. If, however, the switch K is turned to its second position $y$, the finger 9' will engage with segment 9 and current will pass from the source L, through finger 7', segment 7, segment 9, to finger 9', through wire 13, actuating coil $o$ of the relay O, contacts of relay O', wire 15, through the auxiliary switch $a^1$ of the switch 1 and through the actuating coil of this switch to ground through the wire 17. The switch 1 will, therefore, close and in closing will close the auxiliary switch $b^1$ which will complete a maintaining circuit for the switch 1 from the maintaining wire 12, after which the auxiliary switch $a^1$ will be opened and the auxiliary switch $c^1$ will be closed. The current passing through the wire 15, even before causing the switch 1 to close, will cause the core of relay O to pull up thereby interrupting the circuit through the wire 16. When, therefore, the auxiliary switch $c^1$ closes, although it will complete a circuit from the wire 16 through the auxiliary switch $a^2$ on switch 2 to the actuating coil of switch 2, this coil will not be energized while the contacts of the relay O are open. Closing of the switch 1, however, has, by opening the auxiliary switch $u^1$, interrupted the circuit through the wire 15 and the actuating coil $o$ of the relay O and the core of this relay will, therefore, be free to drop unless it is held in its raised position by the magnetizing effect of the coil P. As above stated, the relays O and O' are so designed that the coils P and P' will hold the relays open only if the motor current exceeds a certain value. If, therefore, the short-circuiting of the section of resistance $R^1$ increases the current flowing in the motor circuit sufficiently to hold up the relay O, the completion of the circuit through the wire 16 will be retarded until the counter electromotive force of the motor has cut down the current flowing in the motor circuit. The closing of the switch 2, therefore, cannot take place until a certain time interval has elapsed after the closing of switch 1. This time interval will have a certain minimum extent, dependent upon the rate at which the cores of the relays O and O' drop, and will be increased if the current in the motor circuit rises to a value sufficient to make the holding coils P and P' operative. On dropping of the relay O a circuit will be completed from the wire 13, through the coil $o'$ of the relay O', through contacts of relay O, through wire 16, through auxiliary switch $c^1$, auxiliary switch $a^2$ and actuating coil of switch 2 to ground through the wire 17. The relay O' will, therefore, pull up and the switch 2 will close. Switch 2 in closing closes auxiliary switch $b^2$; opens auxiliary switch $a^2$ and closes auxiliary switch $c^2$.

The actuating coil of switch 2 is, therefore, connected to the maintaining wire 12 and the actuating coil of the switch 3 is connected to the wire 15 and will close as soon as the relay O′ has dropped. In this way the closing of the switches 1 to 6 inclusive will take place automatically in succession under the control of the relays O and O′, an interval of time being insured between the closing of said switches, this interval being dependent upon the value of the currents passing in the motor circuit. The successive operation may, of course, be stopped at any time and the switches which have closed held in that position, by throwing the master-switch K back to its first position $x$.

Instead of the relays O and O′ of Fig. 1 a relay $O^2$, shown diagrammatically in Fig. 2 and in detail in Figs. 3 and 4, may be employed. Referring to Figs. 2, 3 and 4 the relay $O^2$ comprises a frame 19 which may be secured in any suitable manner, as by bolts 20, to a base-board 21 preferably of insulating material, within which frame are arranged an actuating coil 22 of small wire and a holding coil 23 of heavy conductor. Arranged for movement within the coil 22 is a core 24 of magnetic material from the bottom of which extends a rod 25 upon which are mounted the movable contact members of the relay. A fixed core 26 is secured to the frame 19 and projects downwardly within the coils 23 and 22, as shown in Fig. 4. A rod 27 may extend upward from the movable core 24 through a hole in the fixed core 26 and by engaging with an adjustable screw 28 will serve as a stop for the core 24 in its upward movement. A brass washer 29 may be placed above the core 24 to prevent sticking of this core to the fixed core 26 in a manner well understood. These parts of the relay may be of any well-known and suitable design. Upon the rod 25 are slidingly mounted a plurality of steel contact disks 30 and 31. The disk 31 is yieldingly held by means of a coil spring 32 against the collar 33 mounted upon the rod 25, the lower end of the spring 32 abutting against the collar 34 also fixed upon the rod. The contact disk 30 is pressed upwardly by a spring 35 the other end of which rests upon the collar 33, the upper side of this disk being engaged by a collar 36 which has a limited movement on the rod 25, this being provided, for example, by means of a pin 37 which passes through a slot in the rod 25. On the rod 25 above the collar 36 is fixed a collar 38 and between this collar and the collar 36 is interposed a spring 39 as shown. The disk 30 engages with fixed contacts 41 and 42 of magnetic material which are secured to the base plate 21 and are surrounded by magnetizing coils 43 and 44 which are connected in series with the contacts 41 and 42 and serve when current passes through these contacts to hold magnetically the disk 30 in engagement with the contacts 41 and 42 while the core 24 rises to its full extent. Similarly, the disk 31 engages with fixed contacts 45 and 46 of magnetic material surrounded by magnetizing coils 47 and 48 connected in series with them and these coils magnetically hold the disk 31 in engagement with fixed contacts 45 and 46 in the same manner as in the case of the disk 30. The coöperating surfaces of the disks 30 and 31 and the contacts 41, 42, 45 and 46 may be silver plated in order to prevent sticking of the disks to the contacts after the magnetizing coils are deënergized and to insure good electrical connection at these points, this expedient being well-known in this art. The slight yielding connection between the collar 36 and the rod 25 insures both disks 30 and 31 being held in close engagement with their coöperating contacts when the relay is down, in a manner obvious from the drawing. When this form of relay is employed, as will be clear from Fig. 2, the wire 13, of Fig. 1, is connected in series with the actuating coil 22 of the relay $O^2$ and at 14′ branches into two circuits which pass through the upper and lower contacts of the relay and connect to the two wires 15 and 16.

The operation of the system of control shown in Fig. 2, when provided with the form of relay illustrated in Figs. 2, 3 and 4, is the same as far as the operation of the line switch $l$ and the resistance controlling switches 1 to 6 inclusive is concerned. When the master switch K is turned to its first position $x$ the line switch $l$ is closed, as described above. Upon turning the master switch K to its position $y$ the circuit through the wire 13 is completed and the wire 15, leading to the operating coil of switch 1, is energized. The relay $O^2$ pulls up at once and in rising lifts the upper disk 30, since this is not magnetically held in engagement with its coöperating contacts, thereby opening the circuit through wire 16. The disk 31, however, is magnetically held in engagement with its contacts until the interruption of the current through the wire 15, due to the closing of the switch 1 and the opening of the auxiliary switch $a^1$, after which the disk 31 snaps upwardly under the influence of the spring 32. If the closing of switch 1 has resulted in increasing the motor current sufficiently to render the holding coil 23 on the relay effective, the core of the relay will be held in its raised position and the circuit through the wire 16 will be maintained interrupted, thereby preventing the operation of the switch 2. When the motor current has decreased sufficiently by the increasing counter-electromotive force of the motor, the core of the relay $O^2$ drops and the circuit through the wire 16 is completed thereby causing closing of the switch 2. As soon as the wire 16 is energized in this way the core of the relay $O^2$ rises, the disk 30 being this time held in engagement with its contacts while the disk 31 is lifted. In this manner the relay $O^2$ acts exactly as do relays O and O' to control the alternate energization of the wires 15 and 16.

While I have shown my invention as embodied in a system of control in which there are but two actuating circuits, I do not wish to be understood as limiting it to such systems since it might equally well be carried out in connection with systems having a greater number of actuating circuits, as will be obvious to those skilled in this art.

What I claim as new and desire to secure by Letters Patent of the United States, is:

1. In combination, a plurality of electrically controlled switches, a plurality of actuating circuits connected successively to successive switches, and means normally closing contacts in all of the actuating circuits and controlled by current through any actuating circuit for temporarily interrupting the succeeding actuating circuit.

2. In combination, a plurality of electrically controlled switches, a plurality of actuating circuits connected successively to successive switches, means controlled by current through any actuating circuit for temporarily interrupting the succeeding actuating circuit, and means controlled by the several switches for connecting the succeeding switch to its actuating circuit.

3. In combination, a plurality of electrically controlled switches, a plurality of actuating circuits connected successively to successive switches, means controlled by current through any actuating circuit for temporarily interrupting the succeeding actuating circuit, and means operated by each switch in closing for opening its actuating circuit.

4. In combination, a plurality of electrically controlled switches, a plurality of actuating circuits connected successively to successive switches, an auxiliary switch closed by each switch except the last in closing for completing the actuating circuit for the succeeding switch, and means operated by current through any actuating circuit for temporarily interrupting the actuating circuit for the succeeding switch before said auxiliary switch of the preceding switch has closed.

5. In combination, a plurality of electrically controlled switches, a plurality of actuating circuits connected successively to successive switches, an auxiliary switch controlled by each of said first named switches for controlling the actuating circuit for that switch, an auxiliary switch closed by each switch except the last in closing for completing the actuating circuit for the succeeding switch, and means operated by current through any actuating circuit for temporarily opening contacts in the actuating circuit for the succeeding switch before the auxiliary switch in that circuit operated by the preceding switch has closed.

6. In combination, a plurality of electrically controlled switches, a plurality of actuating circuits connected successively to successive switches, auxiliary switches controlled by each of said first named switches for completing a holding circuit for that switch and for disconnecting said switch from its actuating circuit, an auxiliary switch closed by each switch except the last in closing for connecting the succeeding switch to its actuating circuit, and a relay mechanism operated by current through any actuating circuit for opening contacts in the succeeding actuating circuit, said mechanism when in its normal position being arranged to close contacts in all the actuating circuits.

7. In combination, a plurality of electrically controlled switches, a plurality of actuating circuits connected successively to successive switches, a plurality of relays the actuating coils of which are each connected in an actuating circuit through contacts opened by the relay in the preceding actuating circuit when energized, auxiliary switches controlled by each of said first named switches for interrupting the connection between that switch and its actuating circuit after said switch has operated, and an auxiliary switch controlled by each of said first named switches except the last for connecting the succeeding switch to its actuating circuit.

8. In combination, a plurality of electrically controlled switches, two actuating circuits arranged to control alternate switches, and means automatically controlled by the current through said actuating circuits for causing energization of said actuating circuits alternately.

9. In combination, a plurality of electrically controlled switches, two actuating circuits arranged to control alternate switches, and electro-magnetically operated means automatically controlled by the current through said actuating circuits for causing energization of said actuating circuits alternately.

10. In combination, a plurality of electrically controlled switches, two actuating circuits arranged to control alternate switches, means controlled by current through said actuating circuits for automatically causing energization of said actuating circuits alternately, and switches operated by said electrically controlled switches for assuring the closing of said last named switches in regular order.

11. In combination, a plurality of electrically controlled switches, two actuating circuits connected to alternate switches, means controlled by current through said actuating circuits for automatically causing temporary energization of said circuits alternately, and means controlled by each switch for completing a maintaining circuit for said switch.

12. In combination, a plurality of electrically controlled switches, two actuating circuits connected to alternate switches, means controlled by current through said actuating circuits for automatically causing temporary energization of said circuits alternately, and means controlled by each switch for completing a maintaining circuit for itself and for connecting the succeeding switch to one of the actuating circuits.

13. In combination, a plurality of electrically controlled switches, two actuating circuits connected to alternate switches, means automatically operated by current through either actuating circuit for opening contacts in the other actuating circuit, and means operated by each switch in closing for disconnecting its actuating coil from its actuating circuit.

14. In combination, a plurality of electrically controlled switches, two actuating circuits connected to alternate switches, auxiliary switches controlled by each of said first named switches for completing a holding circuit for that particular switch and for disconnecting the switch from its actuating circuit, an auxiliary switch closed by each switch except the last in closing for connecting the succeeding switch to its actuating circuit, and relay mechanism operated by current through either actuating circuit for opening contacts in the other actuating circuit, said mechanism when in its normal position being arranged to close contacts in both actuating circuits.

15. In combination, a plurality of electrically controlled switches, two actuating circuits leading to alternate switches, two relays the actuating coils of which are each connected in an actuating circuit through contacts opened by the other relay when energized, auxiliary switches controlled by each of said first named switches for interrupting the connection between the switch and its actuating circuit after said switch has operated, and an auxiliary switch on each of said first named switches except the last for connecting the succeeding switch to its actuating circuit.

16. In combination, a plurality of contactors intended for operation in succession, a source of current, a switch opened by each contactor in closing located in the actuating circuit from said source to that contactor, a switch closed by each contactor except the last in closing located in the actuating circuit from the source to the succeeding contactor, and means electrically controlled by current in the actuating circuit to each contactor except the last for temporarily interrupting the actuating circuit from said source to the succeeding contactor without interrupting the actuating circuit to the contactor about to close.

17. In combination, a plurality of contactors intended for operation in succession, a source of current, a switch opened by each contactor in closing located in the actuating circuit from said source to that contactor, a switch closed by each switch except the last in closing located in the actuating circuit from the source to the succeeding contactor, and means electrically operated by current in the actuating circuit to each contactor except the last for interrupting and maintaining interrupted the actuating circuit to the succeeding contactor while the actuating circuit of the contactor preceding it is receiving current through the first named switch.

In witness whereof, I have hereunto set my hand this 6th day of May, 1908.

ARCHIBALD S. CUBITT.

Witnesses:
BENJAMIN B. HULL,
HELEN ORFORD.